US007769692B2

(12) United States Patent
Iima et al.

(10) Patent No.: US 7,769,692 B2
(45) Date of Patent: Aug. 3, 2010

(54) TRANSMISSION APPARATUS AND METHOD, RECEPTION APPARATUS AND METHOD, MANAGEMENT APPARATUS AND METHOD, CHARGING APPARATUS AND METHOD, PROVIDING APPARATUS AND METHOD, AND RECORDING MEDIUM

(75) Inventors: Shin Iima, Tokyo (JP); Makoto Saito, Tokyo (JP)

(73) Assignee: Sony Corporation, Tokyo (JP)

( * ) Notice: Subject to any disclaimer, the term of this patent is extended or adjusted under 35 U.S.C. 154(b) by 833 days.

(21) Appl. No.: 11/283,230

(22) Filed: Nov. 18, 2005

(65) Prior Publication Data

US 2006/0069648 A1 Mar. 30, 2006

Related U.S. Application Data

(63) Continuation of application No. 09/824,254, filed on Apr. 2, 2001, now Pat. No. 7,054,839.

(30) Foreign Application Priority Data

Apr. 4, 2000 (JP) ............... 2000-102128
May 30, 2000 (JP) ............... 2000-160333

(51) Int. Cl.
*G06F 21/00* (2006.01)
(52) U.S. Cl. ............... 705/52; 705/51; 705/57
(58) Field of Classification Search ............ 705/52, 705/51, 57
See application file for complete search history.

(56) References Cited

U.S. PATENT DOCUMENTS 5,669,007 A * 9/1997 Tateishi .............. 715/210

| 5,710,884 | A | 1/1998 | Dedrick |
| 5,754,787 | A | 5/1998 | Dedrick |
| 6,199,054 | B1 * | 3/2001 | Khan et al. ............ 705/400 |
| 6,640,305 | B2 * | 10/2003 | Kocher et al. ............ 713/194 |
| 6,859,535 | B1 * | 2/2005 | Tatebayashi et al. ........ 380/201 |
| 7,054,839 | B2 * | 5/2006 | Iima et al. ............ 705/52 |
| 2004/0107167 | A1 | 6/2004 | Maari |

FOREIGN PATENT DOCUMENTS

JP   2 166941   6/1990

(Continued)

OTHER PUBLICATIONS

"Mastering Book Internet section Let's get it started! Internet", Fujitsu Ltd., Oct. 31, 1999, First edition, p. 59.

(Continued)

*Primary Examiner*—Pierre E Elisca
(74) *Attorney, Agent, or Firm*—Frommer Lawrence & Haug LLP; William S. Frommer; Paul A. Levy

(57) ABSTRACT

This invention relates to a transmission apparatus for transmitting digital content data via a communication medium, comprising attachment means for attaching cost information per unit data volume to the digital content data; and transmission means for transmitting the digital content data attached with the cost information after converting a data format of the digital content data attached with the cost information into a data format suitable to the communication medium.

11 Claims, 15 Drawing Sheets

FOREIGN PATENT DOCUMENTS

| | | |
|---|---|---|
| JP | 6 197106 | 7/1994 |
| JP | 10-187267 | 7/1998 |
| JP | 10 269 289 | 10/1998 |
| JP | 11-66182 | 3/1999 |
| JP | 11 143719 | 5/1999 |
| WO | WO 98 54672 | 12/1998 |
| WO | WO 99 44165 | 9/1999 |

OTHER PUBLICATIONS

Masumi Kato et al., First step for the retail business to succeed, Explanation of electronic settlement in EC era, Internet magazine, Impress Co., Ltd., Nov. 1, 1999, No. 58, p. 233-243.

Masumi Kato, This is the point! Popular shops in Internet, Point 4 [Collection of money] How to collect money in Internet era, Let's make an attractive Home Page! May 1999, Impress Co., Ltd., Apr. 29, 1999 p. 36-39.

\* cited by examiner

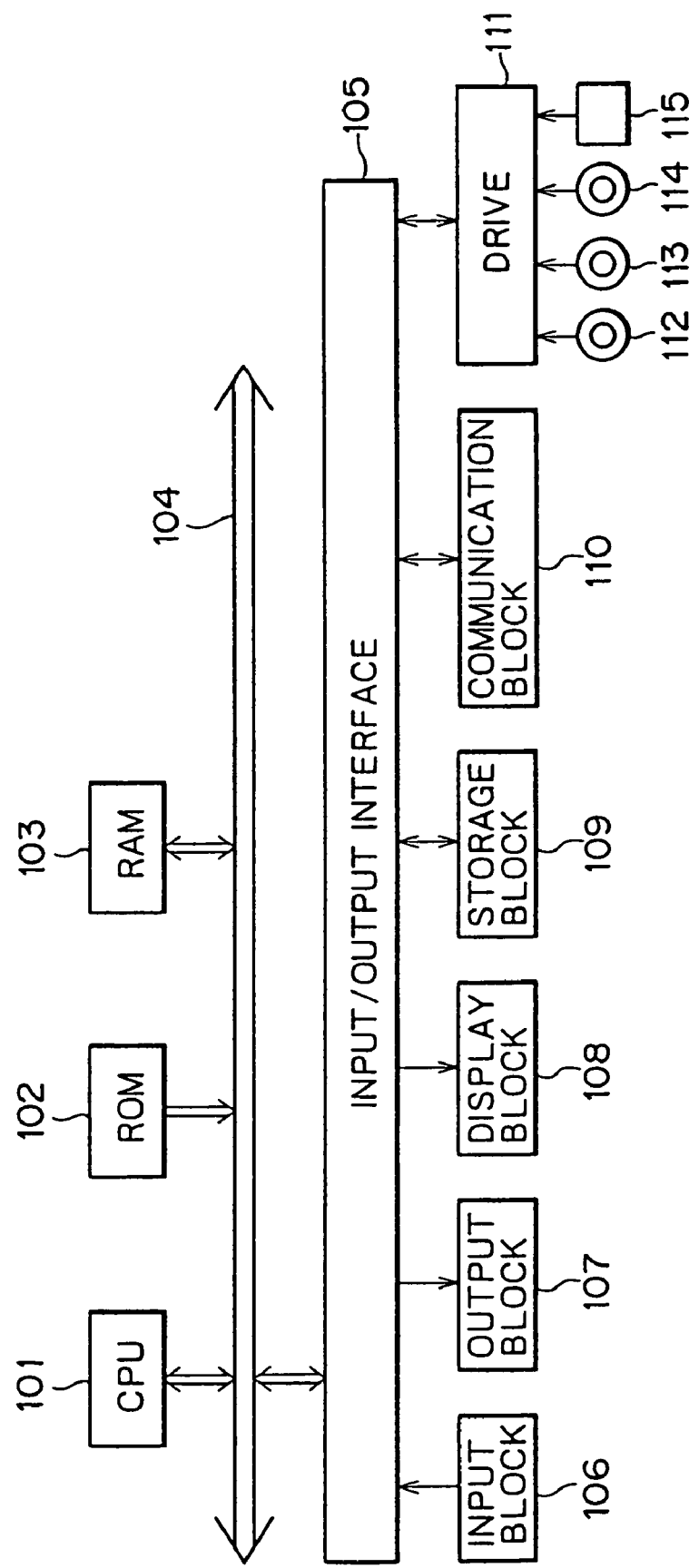

TRANSMISSION APPARATUS AND METHOD, RECEPTION APPARATUS AND METHOD, MANAGEMENT APPARATUS AND METHOD, CHARGING APPARATUS AND METHOD, PROVIDING APPARATUS AND METHOD, AND RECORDING MEDIUM

This application is a continuation of U.S. application Ser. No. 09/824,254, filed Apr. 2, 2001 now U.S. Pat. No. 7,054,839.

BACKGROUND OF THE INVENTION

The present invention relates generally to a transmission apparatus and method, a reception apparatus and method, a management apparatus and method, a charging apparatus and method, a providing apparatus and method, and a recording medium. More particularly, the present invention relates to a transmission apparatus and method, a reception apparatus and method, a management apparatus and method, a charging apparatus and method, a providing apparatus and method, and a recording medium which are suitably for use in distribution and sale of content data for example via information communication media.

Currently, services are being practiced in which digital content data such as news, video data, music, and games are distributed and sold via networks like public switched lines and the Internet. Purchasers of these digital content data must pay two kinds of fees, data communication fee and content fee, separately as shown in FIG. 1.

The volume of the data communication fee is determined depending on an volume of data (or the number of packets) communicated or a time spent for the data communication.

The unit of content fee setting is one piece of digital content data. In this unit, each content fee is determined by considering the attributes of the digital content data, namely type (AV data, still picture data, text data, etc.), quality (compression scheme, transfer rate, etc.), data freshness (new version, old version, brand, etc.), usage conditions (the number of times used, duration of time used, etc.), and copyright information (copy free, copy protected, etc.)

However, the payment of two kinds of fees for purchased digital content data presents a problem that, for users who want to use only part of particular digital content data, the content fee setting system must be divided into segments.

SUMMARY OF THE INVENTION

It is therefore an object of the present invention to sell digital content data in any requested data volume by distributing requested digital content data with the information about the cost per unit data volume without dividing the content fee setting system into segments.

In carrying out the invention and according to one aspect thereof, there is provided a transmission apparatus for transmitting digital content data via a communication medium, comprising: attachment means for attaching cost information per unit data volume to the digital content data; and transmission means for transmitting the digital content data attached with the cost information after converting a data format of the digital content data attached with the cost information into a data format suitable to the communication medium.

In the above-mentioned transmission apparatus, the attachment means attaches, as the cost information, at least one of a unit price of the unit data volume and attribute information of the digital content data thereto.

The above-mentioned transmission apparatus further comprises division means for dividing the digital content data into predetermined unit data volumes.

The above-mentioned transmission apparatus still further comprises notification means for notifying a management unit of transmission information about the digital content data transmitted by the transmission means.

The above-mentioned notification means notifies the management unit of, as transmission information about the digital content data transmitted by the transmission means, at least one of the cost information, information for identifying a sender, information for identifying a recipient, and a data volume of the digital content data transmitted.

In carrying out the invention and according to another aspect thereof, there is provided a transmission method for transmitting digital content data via a communication medium, comprising the steps of: attaching cost information per unit data volume to the digital content data; and transmitting the digital content data attached with the cost information after converting a data format of the digital content data attached with the cost information into a data format suitable to the communication medium.

In carrying out the invention and according to still another aspect thereof, there is provided a recording medium recording a computer-readable program for the above-mentioned transmission apparatus, the computer-readable program comprising the steps of: attaching cost information per unit data volume to the digital content data; and transmitting the digital content data attached with the cost information after converting a data format of the digital content data attached with the cost information into a data format suitable to the communication medium.

In carrying out the invention and according to yet another aspect thereof, there is provided a reception apparatus for receiving digital content data transmitted via a communication medium, comprising: reception means for receiving the digital content with its data format converted into a data format suitable for the communication medium and restoring the received digital content data; removal means for removing the cost information from the restored digital content data; and reproduction means for reproducing the digital content data deprived of the cost information.

The above-mentioned reception apparatus further comprises notification means for notifying a management unit of reception information about the digital content data received by the reception means.

In the above-mentioned reception apparatus, the notification means notifies, as the reception information about the digital content data received by the reception means, at least one of the cost information, information for identifying a sender, information for identifying a recipient, and a data volume of the received digital content data.

In carrying out the invention and according to a different aspect therefor, there is provided a reception method for receiving digital content data transmitted via a communication medium, comprising the steps of: receiving the digital content with its data format converted into a data format suitable for the communication medium and restoring the received digital content data; removing the cost information from the restored digital content data; and reproducing the digital content data deprived of the cost information.

In carrying out the invention and according to a still different aspect thereof, there is provided a recording medium recording a computer-readable program for the above-mentioned reception apparatus, the computer-readable program comprising the steps of: receiving the digital content with its data format converted into a data format suitable for the communication medium and restoring the received digital content data; removing the cost information from the restored digital content data; and reproducing the digital content data deprived of the cost information.

In carrying out the invention and according to a yet different aspect thereof, there is provided a management apparatus for managing purchase and sale of digital content data transmitted from a transmission unit and received by a reception unit via a communication medium, comprising: reception means for receiving at least one of transmission information and reception information about the digital content data from a given point on a communication route between the transmission unit and the reception unit inclusive; and computation means for computing, on the basis of at least one of the transmission information and the reception information received by the reception means, a sale price of the digital content data via the communication medium.

The above-mentioned management apparatus further comprises transmission means for transmitting information about the sale price of the digital content data computed by the computation means to a charging unit.

In the above-mentioned management apparatus, the computation means computes the price of the digital content data sold via the communication medium by multiplying cost information included in the reception information received by the reception means by a data volume of the received digital content data.

In carrying out the invention and according to a separate aspect thereof, there is provided a management method for managing purchase and sale of digital content data transmitted from a transmission unit and received by a reception unit via a communication medium, comprising the steps of: receiving at least one of transmission information and reception information about the digital content data from a given point on a communication route between the transmission unit and the reception unit including the both; and computing, on the basis of at least one of the transmission information and the reception information received in the reception step, a sale price of the digital content data via the communication medium.

In carrying out the invention and according to a still separate aspect thereof, there is provided a recording medium recording a computer-readable program for the above-mentioned management apparatus, the computer-readable program comprising the steps of: receiving at least one of transmission information and reception information about the digital content data from a given point on a communication route between the transmission unit and the reception unit including the both; and computing, on the basis of at least one of the transmission information and the reception information received in the reception step, a sale price of the digital content data via the communication medium.

In carrying out the invention and according to another aspect thereof, there is provided a first charging apparatus for charging for digital content data attached with cost information per unit data volume transmitted from a transmission unit to a reception unit via a communication medium, comprising: acquisition means for acquiring a sale price of the digital content data on the basis of the cost information per unit data volume; and charging means for charging a user of the reception apparatus on the basis of the sale price acquired by the acquisition means.

In the first charging apparatus, the acquisition means acquires the sale price along with a usage fee for using the communication medium and the charging means fees the sale price along with the usage fee further comprises: distribution means for dividing an amount of money paid by the user of the reception unit into a portion covering the sale price and another covering the usage fee.

In carrying out the invention and according to still another aspect thereof, there is provided a first charging method for charging for digital content data attached with cost information per unit data volume transmitted from a transmission unit to a reception unit via a communication medium, comprising the steps of: acquiring a sale price of the digital content data on the basis of the cost information per unit data volume; and charging a user of the reception apparatus on the basis of the sale price acquired in the acquisition step.

In carrying out the invention and according to yet another aspect thereof, there is provided a recording medium recording a computer-readable program for the first charging apparatus, the computer-readable program comprising the steps of: acquiring a sale price of the digital content data on the basis of the cost information per unit data volume; and charging a user of the reception apparatus on the basis of the sale price acquired in the acquisition step.

In carrying out the invention and according to a different aspect thereof, there is provided a second charging apparatus for charging for digital content data transmitted from a transmission unit to a reception unit via a communication medium, comprising: acquisition means for acquiring information about a sale price of the digital content data; synthesis means for synthesizing the information about the sale price acquired by the acquisition means with information about a usage fee for use of the communication medium; and charging means for charging a user of the reception unit on the basis of synthesized information supplied by the synthesis means.

The second charging apparatus further comprises distribution means for dividing an amount of money paid by the user of the reception unit into a portion covering the sale price and another covering the usage fee.

In carrying out the invention and according to a still different aspect thereof, there is provided a second charging method for charging for digital content data transmitted from a transmission unit to a reception unit via a communication medium, comprising: acquiring information about a sale price of the digital content data; synthesizing the information about the sale price acquired in the acquisition step with information about a usage fee for use of the communication medium; and charging a user of the reception unit on the basis of synthesized information supplied in the synthesis step.

In carrying out the invention and according to a yet different aspect thereof, there is provided a recording medium recording a computer-readable program for the second charging apparatus, the computer-readable program comprising: acquiring information about a sale price of the digital content data; synthesizing the information about the sale price acquired in the acquisition step with information about a usage fee for use of the communication medium; and charging a user of the reception unit on the basis of synthesized information supplied in the synthesis step.

In carrying out the invention and according to a separate aspect thereof, there is provided a third charging apparatus for charging for digital content data transmitted from a transmission unit to a reception unit, comprising: acquisition means for acquiring information about sale price of the digital content data: synthesis means for synthesizing the information about sale price acquired by the acquisition means with information about a usage fee for use of information transmitted from the transmission unit; and charging means for charging a user of the reception unit on the basis of the synthesized information supplied by the synthesis means.

The third charging apparatus further comprises distribution means for dividing an mount of money paid by the user of the reception unit into a portion covering the sale price and another covering the usage fee.

In carrying out the invention and according to a still separate aspect thereof, there is provided a third charging method for charging for digital content data transmitted from a transmission unit to a reception unit, comprising the steps of: acquiring information about sale price of the digital content data: synthesizing the information about sale price acquired in the acquisition step with information about a usage fee for use of information transmitted from the transmission unit; and charging a user of the reception unit on the basis of the synthesized information supplied in the synthesis step.

In carrying out the invention and according to a yet separate aspect thereof, there is provided a recording medium for the third charging apparatus, the computer-readable program comprising the steps of: acquiring information about sale price of the digital content data: synthesizing the information about sale price acquired in the acquisition step with information about a usage fee for use of information transmitted from the transmission unit; and charging a user of the reception unit on the basis of the synthesized information supplied in the synthesis step.

In carrying out the invention and according to a yet different aspect thereof, there is provided a fourth charging apparatus for charging for a predetermined service ordered from a first unit to a second unit via a network, comprising: extraction means for extracting cost information from order information provided by the second unit to the first unit for ordering the predetermined service from the first unit to the second unit via the network; and charging means for charging a user of the first unit on the basis of the cost information extracted by the extraction means.

In the fourth charging apparatus, the extraction means extracts the cost information from the order information at a given point on the network between the first unit and the second unit inclusive.

In carrying out the invention and according to another aspect thereof, there is provided a fourth charging method for charging for a predetermined service ordered from a first unit to a second unit via a network, comprising the steps of: extracting cost information from order information provided by the second unit to the first unit for ordering the predetermined service from the first unit to the second unit via the network; and charging a user of the first unit on the basis of the cost information extracted in the extraction step.

In carrying out the invention and according to still another aspect thereof, there is provided a recording medium recording a computer-readable program for the fourth charging apparatus, the computer-readable program comprising the steps of: extracting cost information from order information for ordering the predetermined service from the first unit to the second unit via the network; and charging a user of the first unit on the basis of the cost information extracted in the extraction step.

In carrying out the invention and according to yet another aspect thereof, there is provided a providing apparatus for providing a predetermined service ordered from a unit via a network, comprising: attachment means for attaching cost information about the predetermined service to order information for ordering the predetermined service by a user of the unit; transmission means for transmitting the order information attached with the cost information to the unit via the network; and acceptance means for accepting an order placed by the unit via the network on the basis of the order information transmitted by the transmission means.

The above-mentioned providing apparatus further comprises instruction means for instructing the providing apparatus to provide the ordered service the unit when the order placed on the basis of the order information transmitted by the transmission means has been accepted by the acceptance means.

In carrying out the invention and according to a separate aspect thereof, there is provided a providing method for providing a predetermined service ordered from a unit via a network, comprising the steps of: attaching cost information about the predetermined service to order information for ordering the predetermined service by a user of the unit; transmitting the order information attached with the cost information to the unit via the network; and accepting an order placed by the unit via the network on the basis of the order information transmitted in the transmission step.

In carrying of the invention and according to a still separate aspect thereof, there is provided a recording medium recording a computer-readable program for the above-mentioned providing apparatus, the computer-readable program comprising the steps of: attaching cost information about the predetermined service to order information for ordering the predetermined service by a user of the unit; transmitting the order information attached with the cost information to the unit via the network; and accepting an order placed by the unit via the network on the basis of the order information transmitted in the transmission step.

In the transmission apparatus and method and recording medium associated with the invention, cost information per unit data volume is attached to digital content data, the resultant digital content data is converted into a data format suitable for a communication network, and the resultant digital content data are transmitted.

In the reception apparatus, reception method, and recording medium associated with the invention, the digital content data in the data format suitable for the communication medium are received and restored to their original data format. The cost information is separated from the restored digital content data and the resultant digital content data are reproduced.

In the management apparatus and method and recording medium associated with the invention, transmission information or reception information is received from a given point on a communication route between a transmission unit and a reception unit inclusive and, on the basis of the received information, the sale price of digital content data sold via a communication medium is computed.

In the first charging apparatus and method and recording medium associated with the invention, the sale price information of digital content data is acquired on the basis of the price information per unit data volume. In addition, on the basis of the acquired sale price, a charging process is performed on the user of the reception unit that has received the digital content data.

In the second charging apparatus and method and recording medium associated with the invention, the sale price information of digital content data is acquired and the acquired sale price information is synthesized with a usage fee of a communication medium. In addition, on the basis of the synthesized information, a charging process is executed on the user of the reception unit that has received the digital content data.

In the third charging apparatus and method and recording medium associated with the invention, the sale price information of digital content data is acquired and the acquired sale price information is synthesized with a usage fee of the information separate from the digital content data, the information transmitted from the transmission unit that has transmitted the digital content data. On the basis of the synthesized information, a charging process is performed on the user of the reception unit that has received the digital content data and the information.

In the fourth charging apparatus and method and recording medium associated with the invention, cost information is extracted from order information for ordering services from a first unit to a second unit via a network. On the basis of the extracted cost information, a charging process is performed on the user of the first unit.

In the providing apparatus and method and recording medium associated with the invention, cost information for services is added to order information for ordering services from a unit via a network and the resultant information is transmitted to that unit. In addition, the orders of services made on the basis of the order information are accepted.

BRIEF DESCRIPTION OF THE DRAWINGS

These and other objects of the invention will be seen by reference to the description, taken in connection with the accompanying drawing, in which:

FIG. 16 is a block diagram illustrating an exemplary configuration of a personal computer.

DETAILED DESCRIPTION OF PREFERRED EMBODIMENTS

This invention will be described in further detail by way of example with reference to the accompanying drawings.

Figure 1:
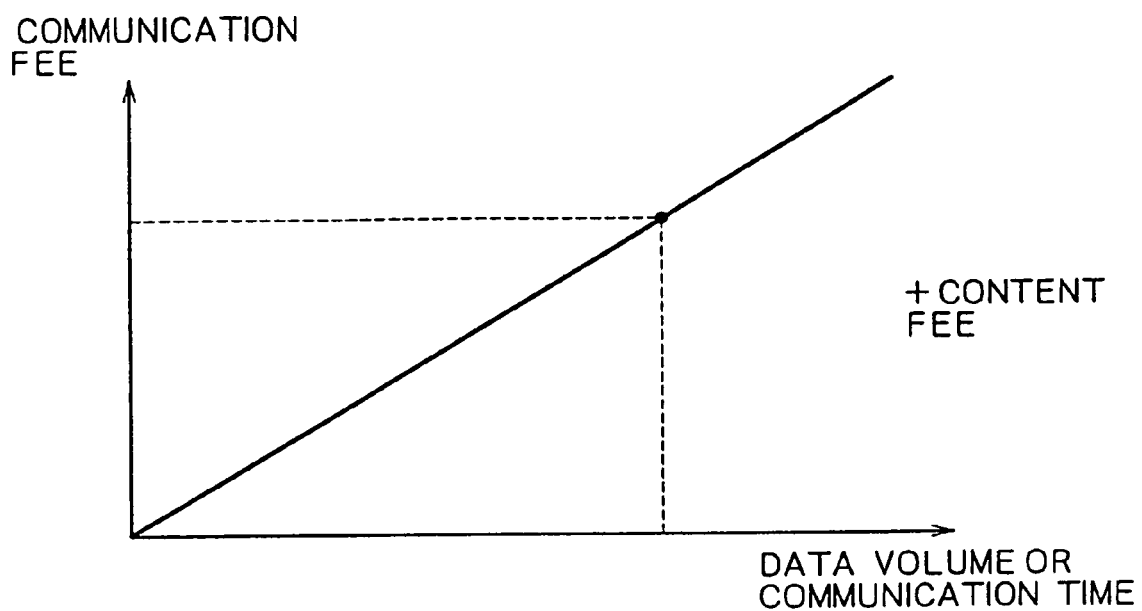
FIG. 1 is a diagram illustrating a related-art fee computation method for the purchase of digital content data.
Figure 2:
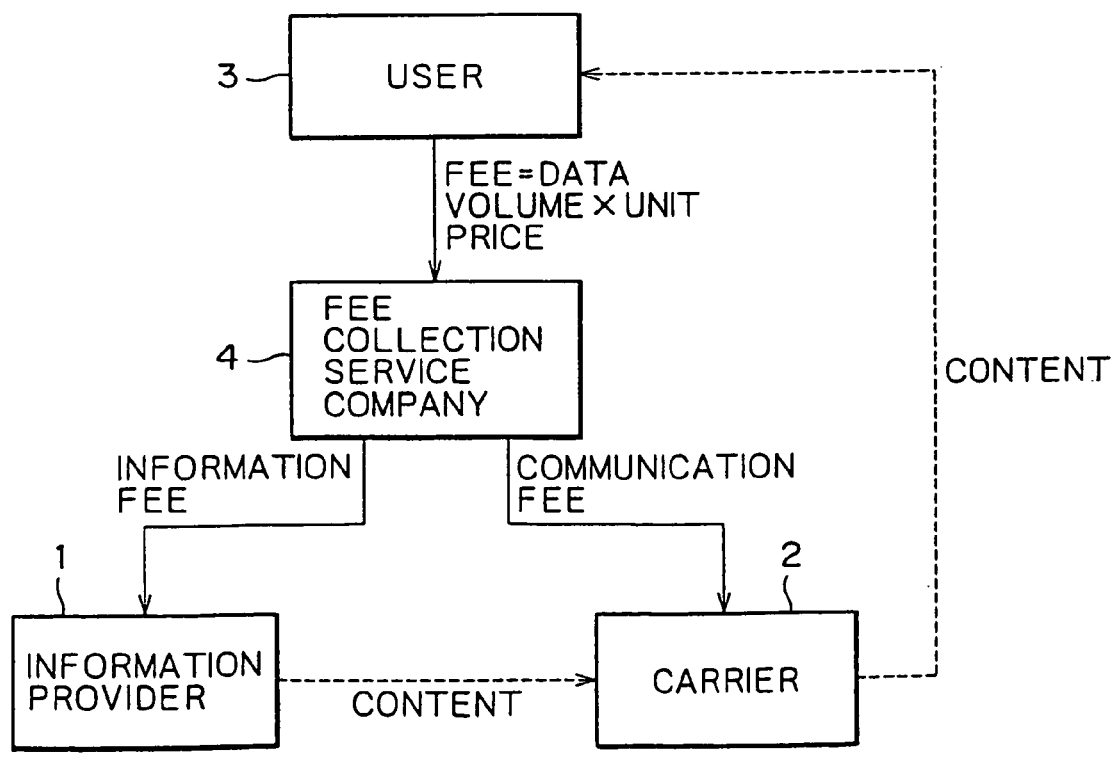
FIG. 2 is a schematic block diagram illustrating a concept of a digital content data distribution system to which the present invention is applied.

Now, referring to FIG. 2, the concept of a digital content data distribution system according to the present invention will be described. The concept of this system is novel in that a cost is integrated with digital content data (hereinafter also referred to simply as content), namely a content fee is included in a communication fee as viewed from the user side, a unit price per unit data volume is set, and the content and the cost are distributed at the same time, namely cost information is attached to digital content data.

In the above-mentioned digital content data distribution system, an information provider 1 which sells content sells content on demand by a user 3. When the purchase of content is requested, cost information per unit data volume is attached to the requested content, which is then transmitted from the information provider 1 to the user 3 via an information communication network (or a communication medium) managed by a carrier 2.

The information provider 1 may be an individual, an institution, or a business entity who is the creator, licenser, owner, collector, manager, or distributor of content for example. The carrier 2 may be an Internet service provider, a telecommunications company, or a broadcasting company for example. Consequently, the information communication network may be the Internet, a public telephone network, a television network, a radio network, a cable television network, and a satellite television network for example.

The user 3 is charged by a fee collection service company 4 for the acquisition of digital content data. The fee is computed by multiplying the data volume of the digital content data acquired by the user 3 by the unit price per unit data volume.

Figure 3:
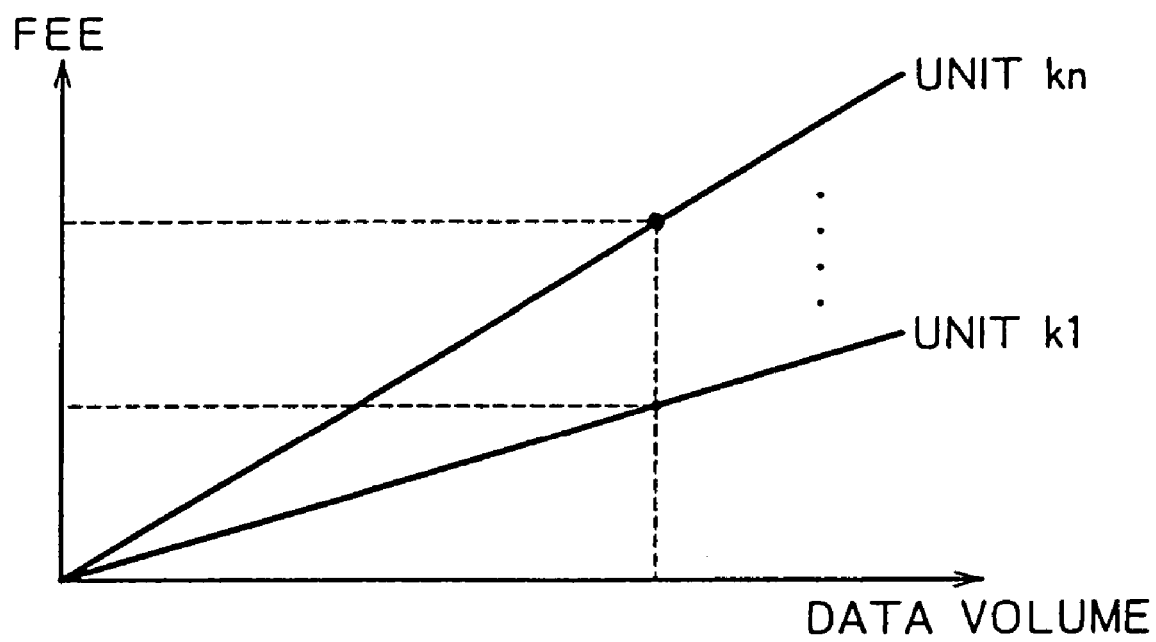
FIG. 3 is a diagram illustrating a fee computation method according to the present invention for the purchase of digital content data.

The cost information per unit data volume (a unit price or information for identifying the unit price) to be attached to digital content data can be set by the content provider 1 as desired. Therefore, as shown in FIG. 3, for a same data volume, its fee may differ from one article of digital content data to another.

The fee collection service company 4 which collected the fee for purchased digital content data from the user 3 distributes the collected fee to the information provider 1 and the carrier 2 in accordance with the agreements concluded between them. It should be noted that various combinations are possible in which the carrier 2 also serves as the charge collection service company 4 for example.

Figure 4:
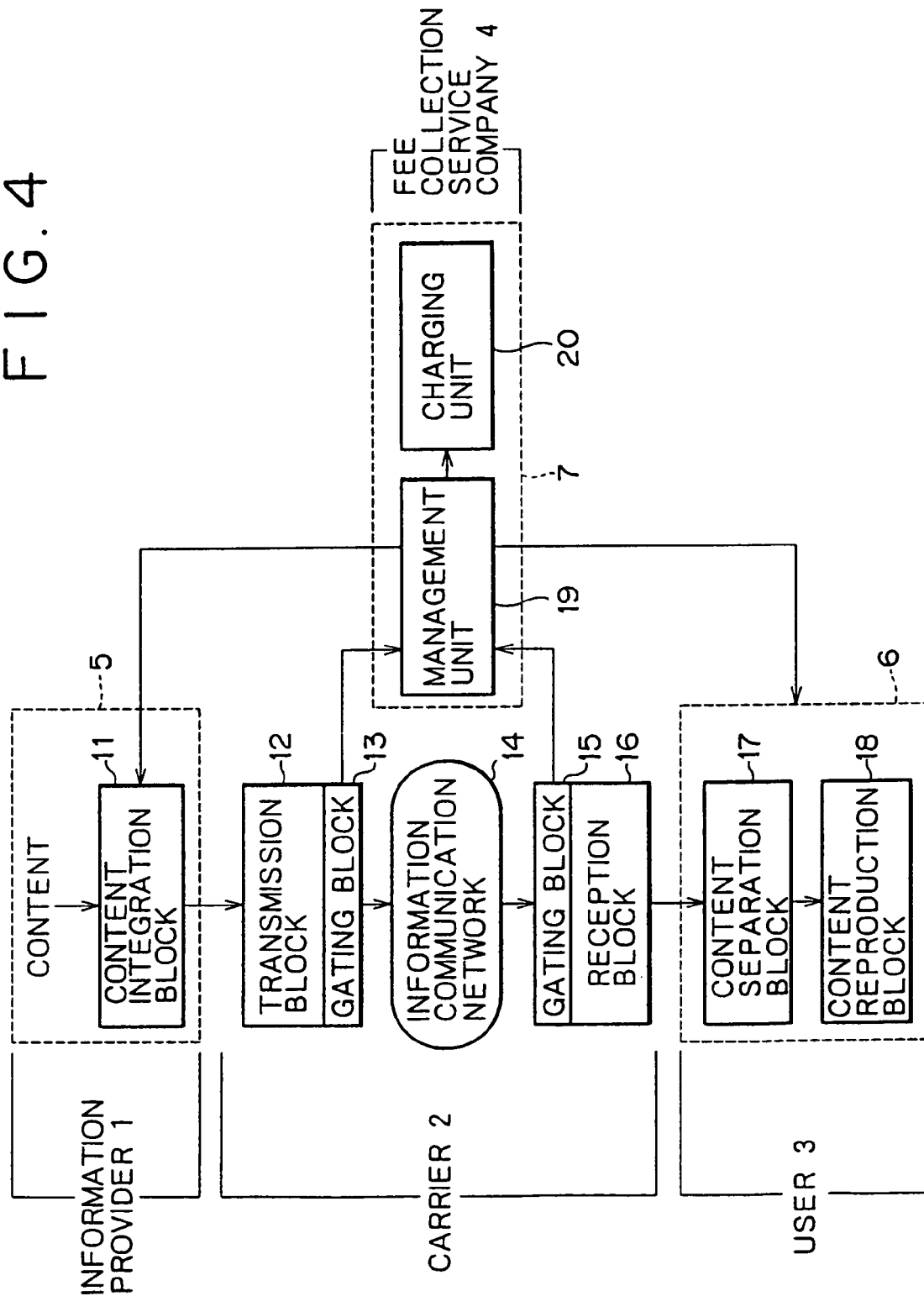
FIG. 4 is a schematic block diagram illustrating an exemplary configuration of the digital content data distribution system to which the present invention is applied.

The following describes an exemplary configuration of the digital content data distribution system associated with the present invention with reference to FIG. 4.

An information providing server 5 is managed by the information provider 1 and comprises a content integration block 11. The components, a transmission block 12 through a reception block 16, are managed by the carrier 2. A user terminal 6 is equivalent to a personal computer for example which is operated by the user 3 and comprises a content separation block 17 and a content reproduction block 18. A fee collection server 7 is managed by the fee collection service company 4 and comprises a management unit 19 and a charging unit 20.

The content integration block 11 adds the cost information about a unit data volume concerned to each predetermined unit data of content and outputs the resultant digital content data to the transmission block 12.

To be more specific, the cost information is added to the header of each packet of digital content data and the resultant packet is outputted to the transmission block 12. The cost information may be an amount of money if the unit price (amount of money) of a unit data volume can be determined in the management unit 19 or the information indicative of attributes (type, quality, etc.) of digital content data (in this case, an attribute versus information unit price table must be prepared in the management unit 19).

The transmission block 12 converts the data format of the digital content data attached with the cost information per unit data volume inputted from the content integration block 11 into a data format suitable for the information communication network 14 in accordance with a predetermined protocol. The transmission block 12 transmits the converted digital content data to the reception block 16 via the information communication network 14.

A gating block 13 of the transmission block 12 acquires information for identifying the communication information (attached cost information, transmitted data volume, communication time, and sender (namely the information provider 1) associated with the digital content data to be transmitted via the information communication network 14 and the information about the recipient (namely the user 3) and sends these pieces of acquired information to the management unit 19.

A gating block 15 of the reception block 16 acquires the information for identifying the communication information (added cost information, received data volume, communication time, and sender (namely the information provider 1) associated with the digital content received via the information communication network 14 and the information about the recipient (namely the user 3) and transmits these pieces of acquired information to the management unit 19.

It should be noted that the processes by the gating blocks 13 and 15 may be executed at the same time the digital content data are transmitted and received or, after storing the communicated information, or the digital content data, for a predetermined period, the communicated information accumulated in that period may be collectively transmitted to the management unit 19.

The reception block 16 receives the digital content data via the information communication network 14, restores the original data format of the received digital content data in accordance with a predetermined protocol, and outputs the resultant content to the content separation block 17.

The content separation block 17 separates the cost information from the digital content data and outputs the resultant digital content data to the content reproduction block 18. The content reproduction block 18 reproduces the digital content data removed of the cost information inputted from the content separation block 17.

The management unit 19 compares the communication information received from the gating block 13 of the transmission block 12 with the communication information received from the gating block 16 of the reception block 16. If the supply of the digital content data from the information provider to the user has been confirmed (the confirmation may be made from the communication information outputted from one of the gating blocks 13 and 15), the management unit 19 computes multiplies the cost information included in the communication information by the data volume to compute the sale price of the digital content data and outputs the sale price to the charging unit 20.

Also, the management unit 19 sends the usage information and charging information of the digital content data to the information providing server 5 and the user terminal 6.

The charging unit 20 charges the user 3 for the digital content data on the basis of the sale price received from the management unit 19.

The following describes a sequence of processes for providing digital content data from the information provider 1 to the user 3 and the distribution of the amount of money collected from the user 3 to the information provider 1 and the carrier 2 with reference to the flowcharts shown in FIGS. 5 through 8.

Figure 5:
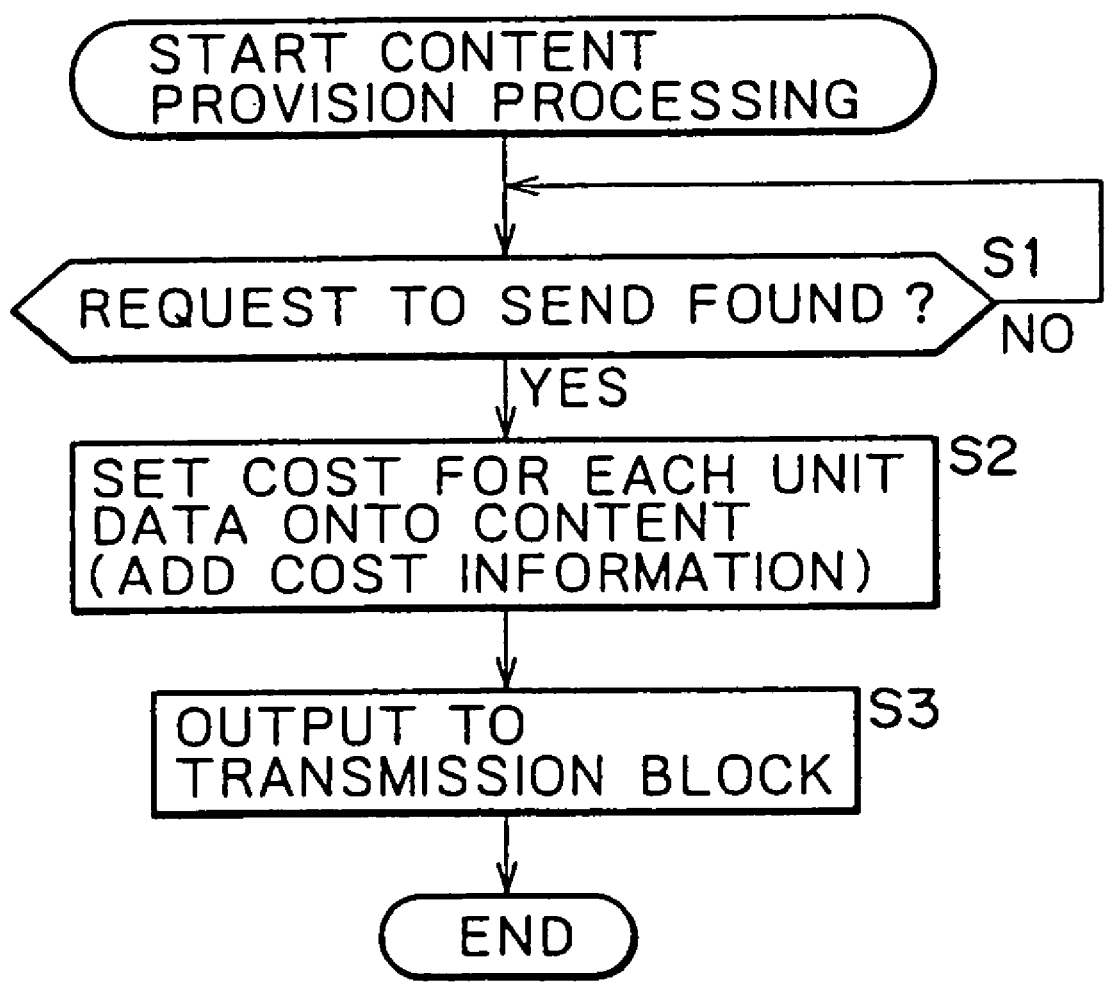
FIG. 5 is a flowchart describing content providing processing.

First, the content provision processing by the information providing server 5 managed by the information provider 1 will be described with reference to the flowchart shown in FIG. 5.

In step S1, the information providing server 5 checks for a request for content from the user terminal 6 operated by the user 3. This operation is repeated until a request has come. If a request for content is found, the procedure goes to step S2.

In step S2, the information providing server 5 reads the requested content from a predetermined content database. Each unit data volume of the retrieved content is integrated by the content integration block 11 with the cost information of that unit data volume. In step S3, the content integration block 11 outputs the digital content data attached with the cost information in step S2 to the transmission block 12.

Figure 6:
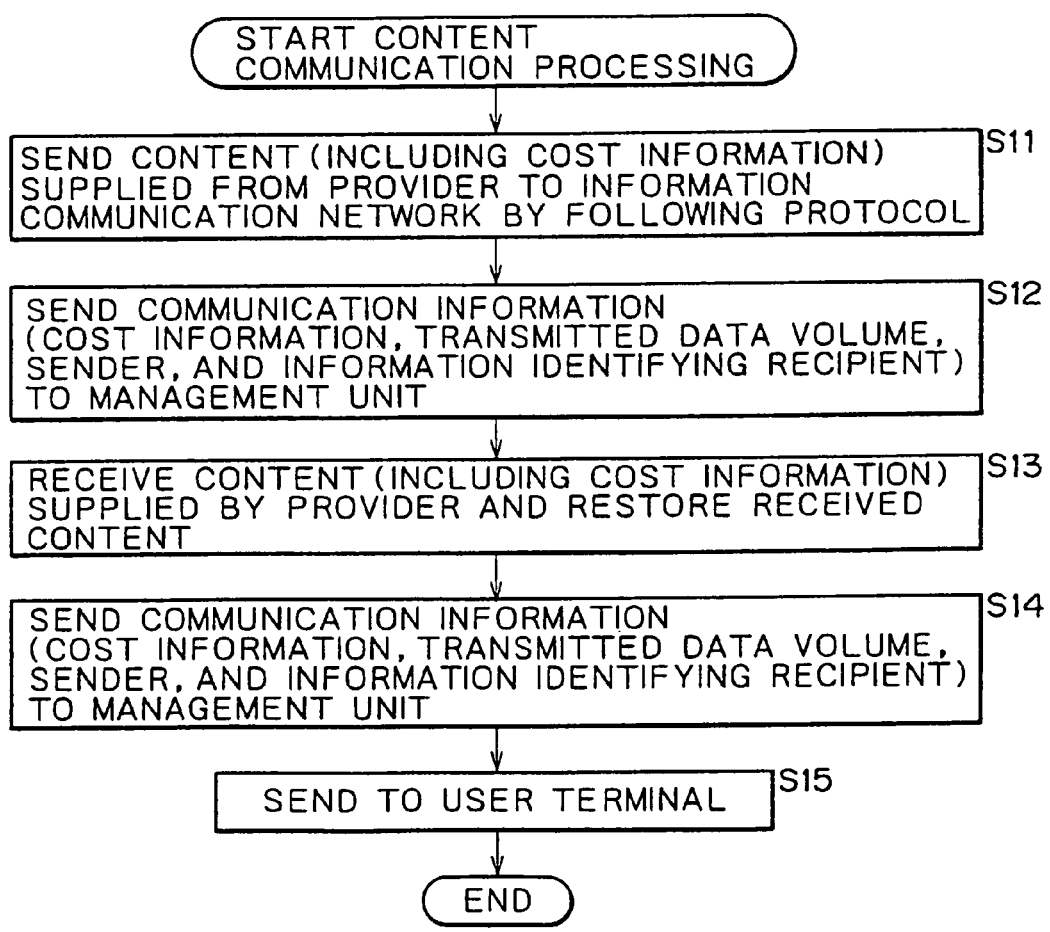
FIG. 6 is a flowchart describing content communication processing.
Figure 7:
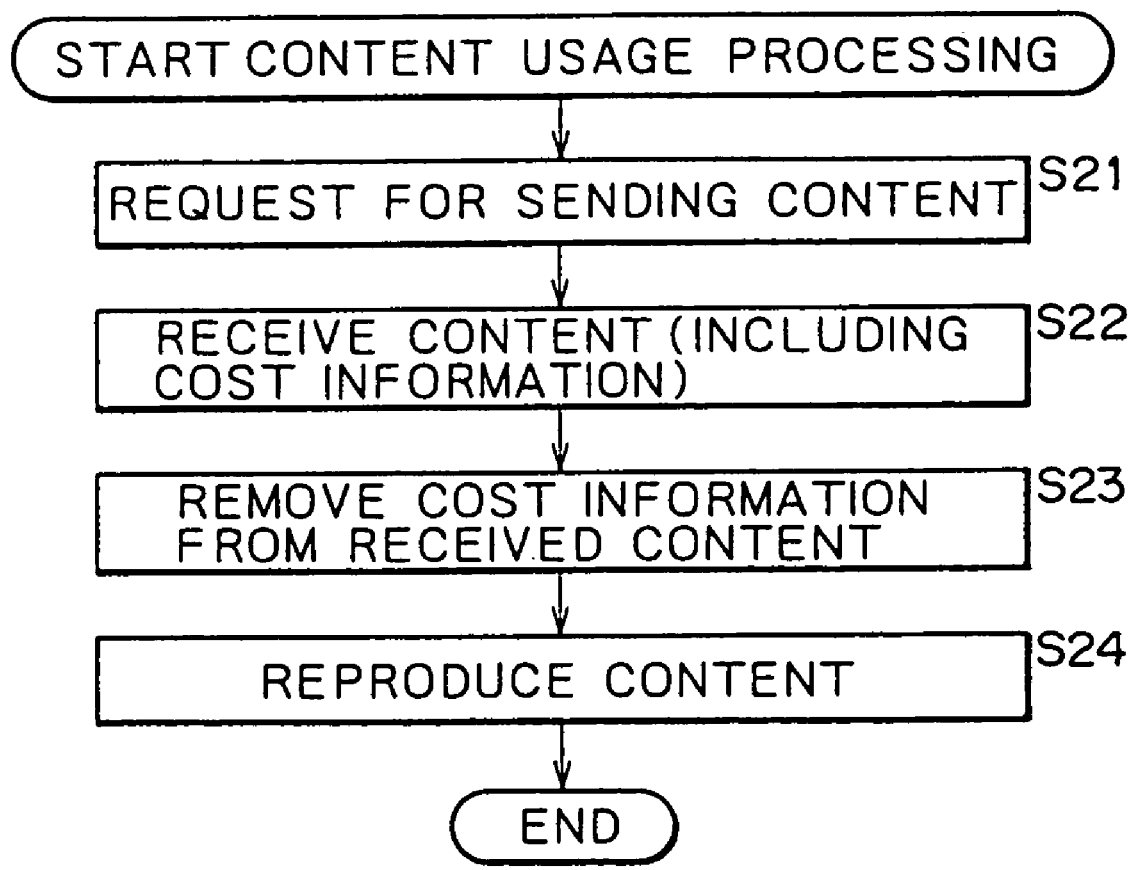
FIG. 7 is a flowchart describing content usage processing.

The following describes the content communication processing by the components, the transmission block 12 through the reception block 16, managed by the carrier 2 with reference to the flowchart shown in FIG. 6.

In step S11, the transmission block 12 converts the data format of the digital content data attached with the cost information inputted from the information providing server 5 into a data format suitable for the information communication network in accordance with a predetermined protocol and sends the resultant digital content data to the reception block 16 via the information communication network 14.

In step S12, the gating block 13 of the transmission block 12 acquires the information for identifying the communication information (attached cost information, transmitted data volume, communication time, and sender (namely the information provider 1) associated with the transmitted digital content data and the information associated with the recipient (the user 3)) and sends these pieces of information to the management unit 19.

In step S13, the reception block 16 restores the original format of the digital content data received via the information communication network 14 in accordance with a predetermined protocol. In step S14, the gating block 15 of the reception block 16 acquires the information for identifying the communication information (attached cost information, received data volume, communication time, and sender (namely the information provider 1) associated with the received digital content data and the information associated with the recipient (the user 3)) and sends these pieces of information to the management unit 19.

In step S15, the reception block 16 sends the digital content data restored in step S13 to the user terminal 6.

The following describes the content usage processing by the content separation block 17 and the content reproduction block 18 which constitute the user terminal 6.

In step S21, the user terminal 6 requests the information providing server 5 for digital content data. In response to this request, the information providing server 5 sends the requested digital content data in the same manner as described above.

In step S22, the user terminal 6 receives at the content separation block 17 the digital content data transmitted from the reception block 16.

In step S23, the content separation block 17 separates the cost information from the digital content data received in step S22 and sends the resultant digital content data to the reproduction block 18.

In step S24, the content reproduction block 18 reproduces the digital content data removed of the cost information inputted from the content separation block 17.

Figure 8:
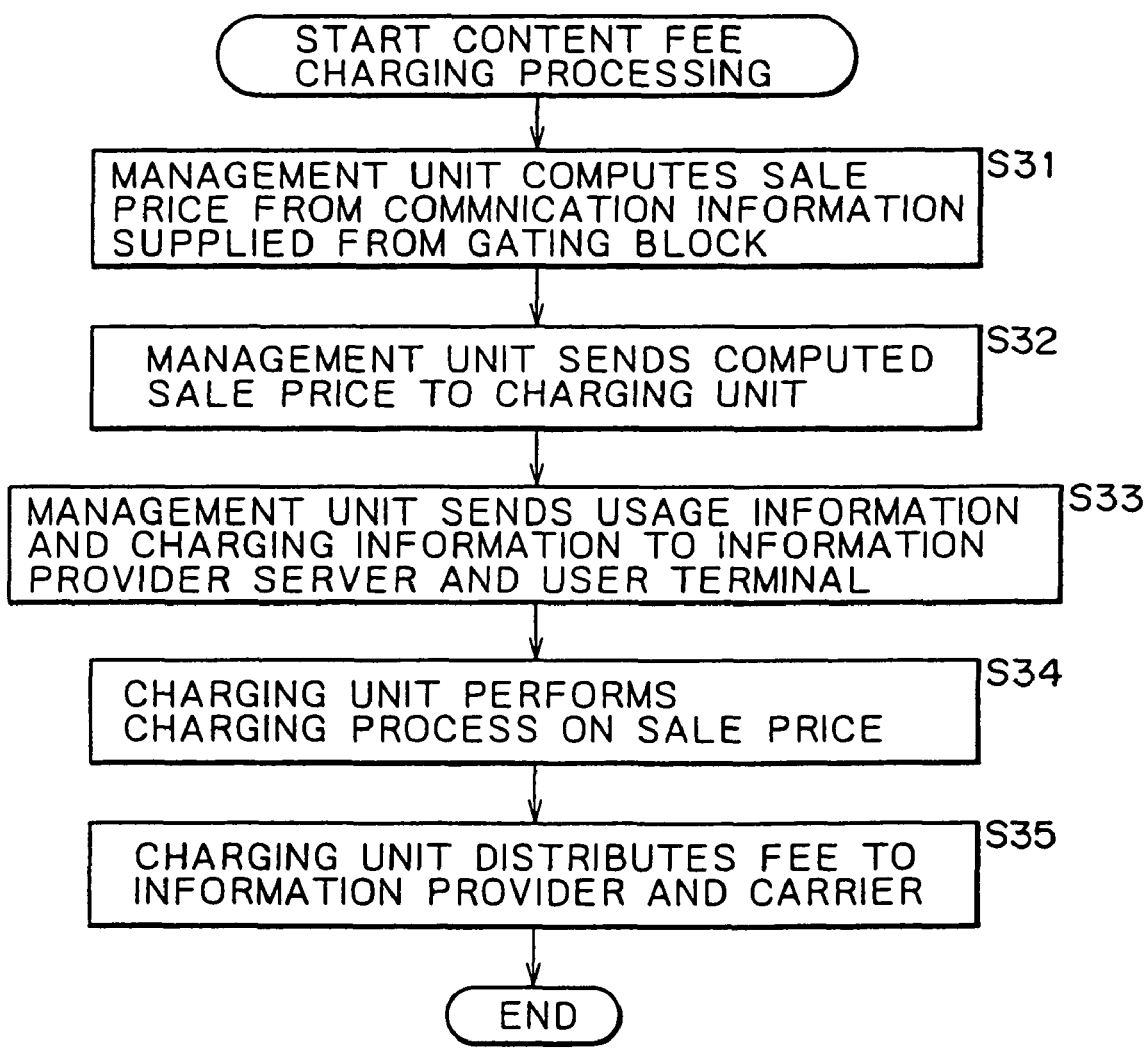
FIG. 8 is a flowchart describing content fee charging processing.

The following describes content fee charging processing by the management unit 19 and the charging unit 20 constituting the fee collection server 7 managed by the fee collection service company 4, with reference to the flowchart shown in FIG. 8.

In step S31, the management unit 19 matches the communication information supplied from the gating block 13 of the transmission block 12 with the communication information supplied from the gating block 15 of the reception block 16 to confirm that the digital content data have been supplied from the information provider server 5 to the user terminal 6. Then, the management unit 19 multiplies the cost information (namely, unit price) included in the communication information by the received data volume on the side of the user terminal 6 (namely, the transmitted data volume on the side of the information provider server 5) to compute the sale price of the digital content data. Further, the management unit 19 computes the communication fee on the basis of the data volume and the communication time.

In step S32, the management unit 19 synthesizes the digital content data sale price obtained in step S31 with the communication fee and sends the result to the charging unit 20 as charging information.

In step S33, the management unit 19 sends the usage information and charging information of the digital content data to the information provider server 5 and the user terminal 6.

In step S34, the charging unit 20 charges the user 3 on the basis of the charging information supplied from the management unit 19 in step S32. Namely, the user 3 is charged for the content sale price included in the communication fee.

In step S35, the charging unit 20 distributes the amount of money collected from the user 3 in step S34 to the information provider 1 (the sale price of the digital content data) and the carrier 2 (the communication fee) in accordance with the agreements previously concluded between the information provider 1 and the carrier 2.

It should be noted that the above-described relationships between the content integration block 11 through content reproduction block 18, the information provider 1, the carrier 2, the user 3, and the fee collection service company 4 are not restricted to them. For example, the transmission block 12 and the gating block 13 may be arranged and managed by the information provider 1. The gating block 15 and the reception block 16 may be included in the user terminal 6. Other variations are also practicable.

Figure 9:
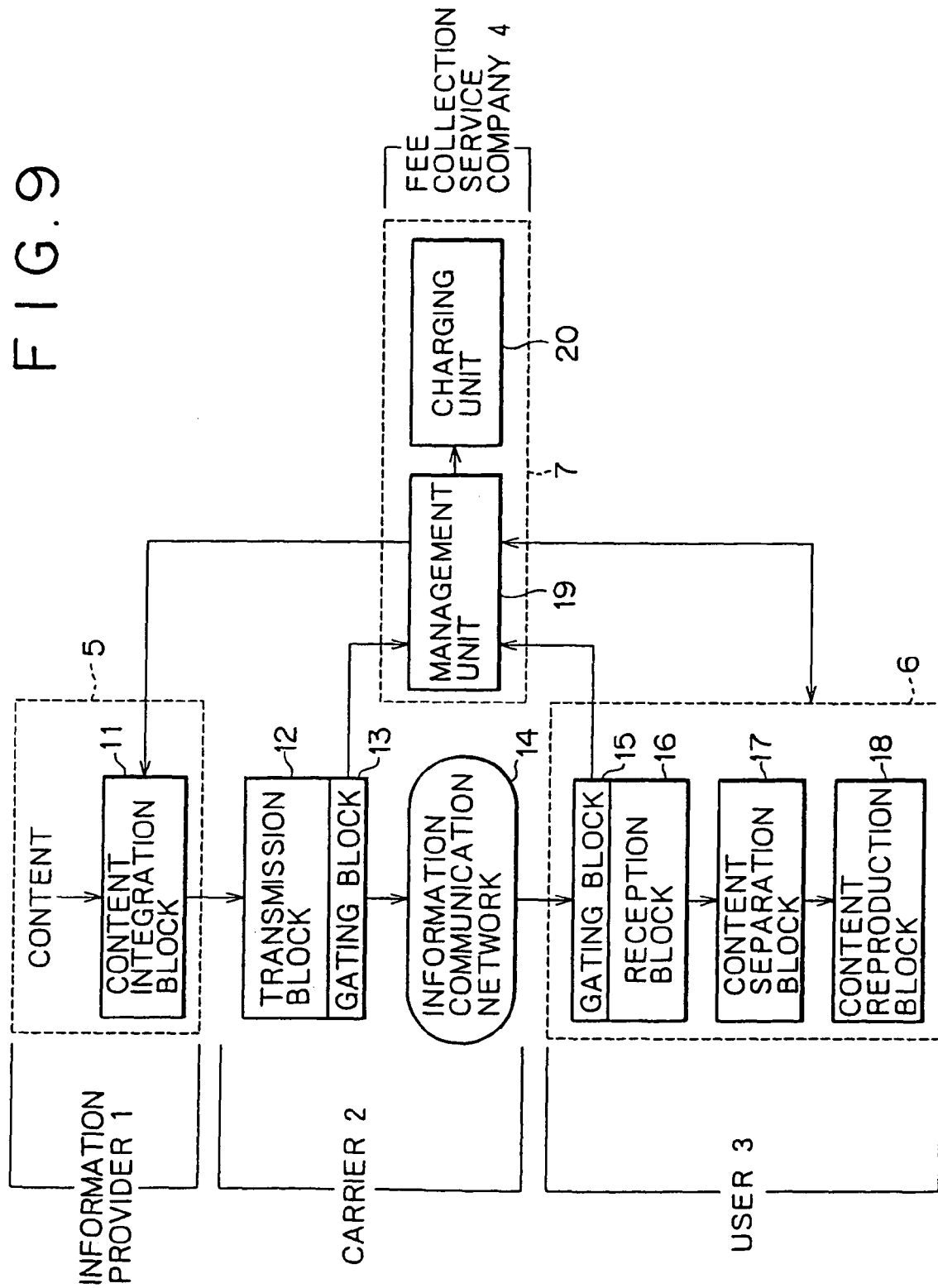
FIG. 9 is another schematic block diagram illustrating an exemplary configuration of the digital content data distribution system to which the present invention is applied.

FIG. 9 shows an exemplary configuration of a digital content data distribution system in which the carrier 2 is a broadcasting company. In this example, a transmission block 12, a gating block 13, and a information communication 14 are prepared as a broadcasting facility network for transmitting the ground or satellite wave. In this example, a gating block 15 is included in a user terminal 6 and the usage information of the received digital content data is sent to a management unit 19 via a public telephone line for example. The charging information to be transmitted to the user terminal 6 from the management unit 19 is also transmitted via the public telephone line for example. In this example, the sale price of digital content data is integrated with the fee of broadcast programs and the resultant amount is charged on the user.

In the foregoing, the digital content data distribution systems have been described in which a unit price per unit data volume of digital content data is set, digital content data are sold in a desired data volume, and the user is charged for that data volume. The present invention is also applicable to a product distribution system.

Figure 10:
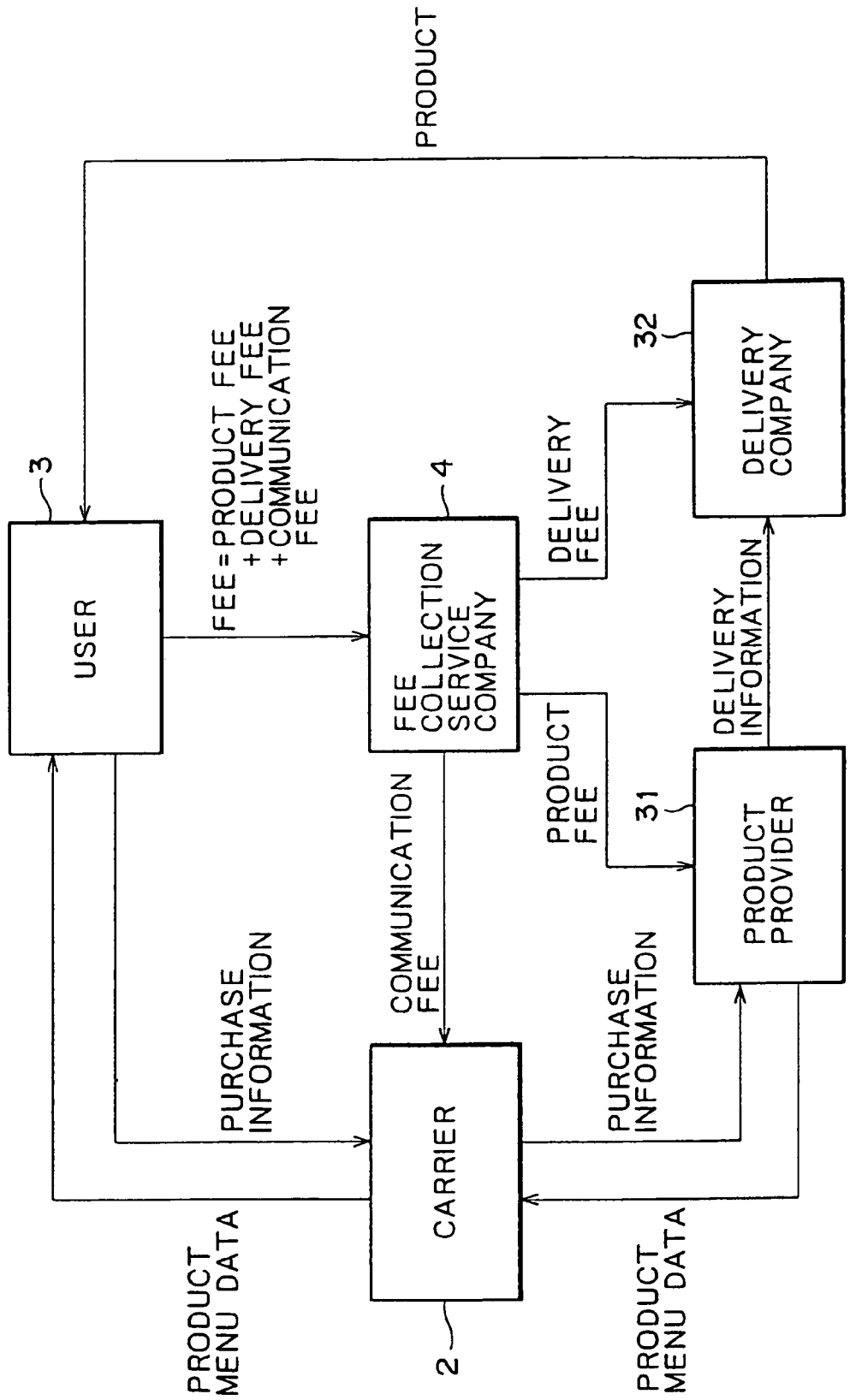
FIG. 10 is a block diagram illustrating a concept of a product distribution system to which the present invention is applied.

First, the concept of a product distribution system to which the present invention is applied will be described with reference to FIG. 10. This novel concept is that product menu data (order information) are accompanied with product costs (or prices).

In this product distribution system, a product provider 31 which sells products sends product menu data via a network (or a communication medium) at the request by a user 3. At this moment, the product menu data are attached with cost information for each product and the resultant data are transmitted from the product provider 31 to the user 3 via an information communication network (or a communication medium) managed by a carrier 2.

If the user 3 received the product menu data and purchases a product from the product menu data, purchase information is transmitted to the product provider 31 from the user 3 via the information communication network managed by the carrier 2. The product provider 31 transmits the delivery information to a delivery company 32 and instructs the delivery of the product specified by the purchase information. Thus, the user 3 can receive the product from the delivery company 32.

The user 3 is charged by a fee collection service company 4 for the purchased product. The price of the product purchased by the user 3 is attached to the product menu data transmitted from the product provider 31 to the user 3 and the fee collection service company 4 detects the product price from the product menu data.

Having collected the fee from the user 3, the fee collection service company 4 distributes the collected fee to the carrier 2, the product provider 31, and a delivery company 32 in accordance with the agreements concluded between them. It should be noted that various other combinations are practicable in which the carrier 2 also serves as the fee collection service company 4 for example.

Figure 11:
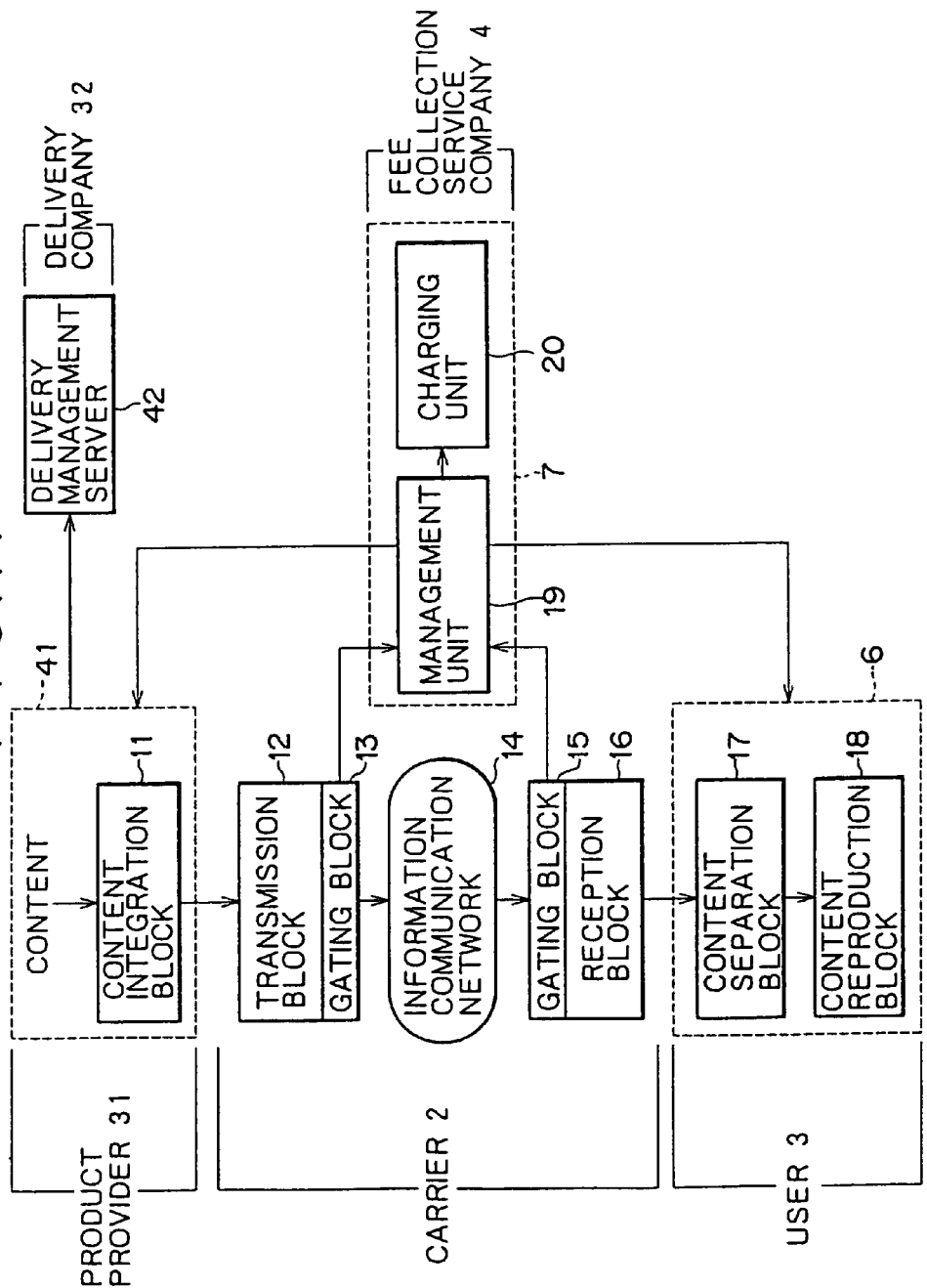
FIG. 11 is a block diagram illustrating an exemplary configuration of the product distribution system to which the present invention is applied.

The following describes an exemplary configuration of the above-mentioned product distribution system with reference to FIG. 11. With reference to FIG. 11, components similar to those previously described with FIG. 4 are denoted by the same reference numerals and the description of these components will be skipped.

A product server 41 is managed by the product provider 31 and constituted by a content integration block 11. The other basic configurational parts are the same as those shown in FIG. 4.

As shown in FIG. 4, the content integration block 11 transmits content; in this example, however, the content integration block 11 outputs product menu data as content. The product menu data are attached with cost information for each product.

To be more specific, the header of a data packet of each product included in the product menu data is written with the cost information of that product and the resultant data packet is transmitted to a transmission block 12. The cost information about each product in this example is not the fee of that product as the data to be displayed on the display monitor of the user terminal 6 but the information which can be automatically determined as the fee for the product in a management unit 19. If the management unit 19 can recognize this information, the fee for the product may be described directly or the information indicative of product attributes (type, quality, etc.) may be described (in the latter case, a table listing the correlation between attribute information and product fees must be prepared in the management unit 19).

The transmission block 12 converts the data format of the product menu data attached with the cost information for each product inputted from the content integration block 11 into a data format suitable for an information communication network 14 and transmits the resultant product menu data to a reception block 16 via the information communication network 14.

A gating block 13 of the transmission block 12 acquires the communication information (attached product cost information, transmitted data volume, sender (namely the product provider 31, recipient (namely, the user 3), and, if the recipient purchases a product, the information for identifying the product to be purchased) about the product menu data received via the information communication network 14 and sends the acquired information to the management unit 19.

A gating block 15 of the reception block 16 acquires the communication information (attached product cost information, received data volume, sender (namely the product provider 31, recipient (namely, the user 3), and, if the recipient purchases a product, the information for identifying the product to be purchased) about the product menu data received via the information communication network 14 and transmits the acquired information to the management unit 19.

It should be noted that the processes by the gating blocks 13 and 15 for the transmission of the product menu data from the product provider 31 may be executed at the same time as the transmission or reception of the product menu data or the product menu data may be transmitted to the management unit 19 every time the product menu data are updated.

The reception block 16 restores the original data format of the product menu data received via the information communication network 14 and outputs the restored product menu data to a content separation block 17.

The content separation block 17 separates the cost information from the product menu data and outputs the resultant product menu data to a content reproduction block 18. The content reproduction block 18 reproduces the product menu data inputted from the content separation block 17.

The management unit 19 receives the communication information from the gating block 13 of the transmission block 12 and the communication information from the gating block 15 of the reception block 16. Further, the management unit 19 matches the received communication information with the information for identifying the purchased product obtained from the purchase information transmitted from the user terminal 6 to the product provider server 41 to extract the sale price of the product ordered by the user 3, transmitting the obtained sale price to a charging unit 20.

Moreover, the management unit 19 sends the usage information of the product menu data and the charging information about the product ordered by the user to the product provider server 41 and the user terminal 6.

The charging unit 20 charges the user 3 for the purchased product on the basis of the sale price supplied from the management unit 19.

The following describes a sequence of processes for supplying product menu data from the product provider 31 to the user 3 and the amount of money collected from the user 3 is distributed to the carrier 2, the product provider 31, and a delivery company 32, with reference to the flowcharts shown in FIGS. 12 through 15.

Figure 12:
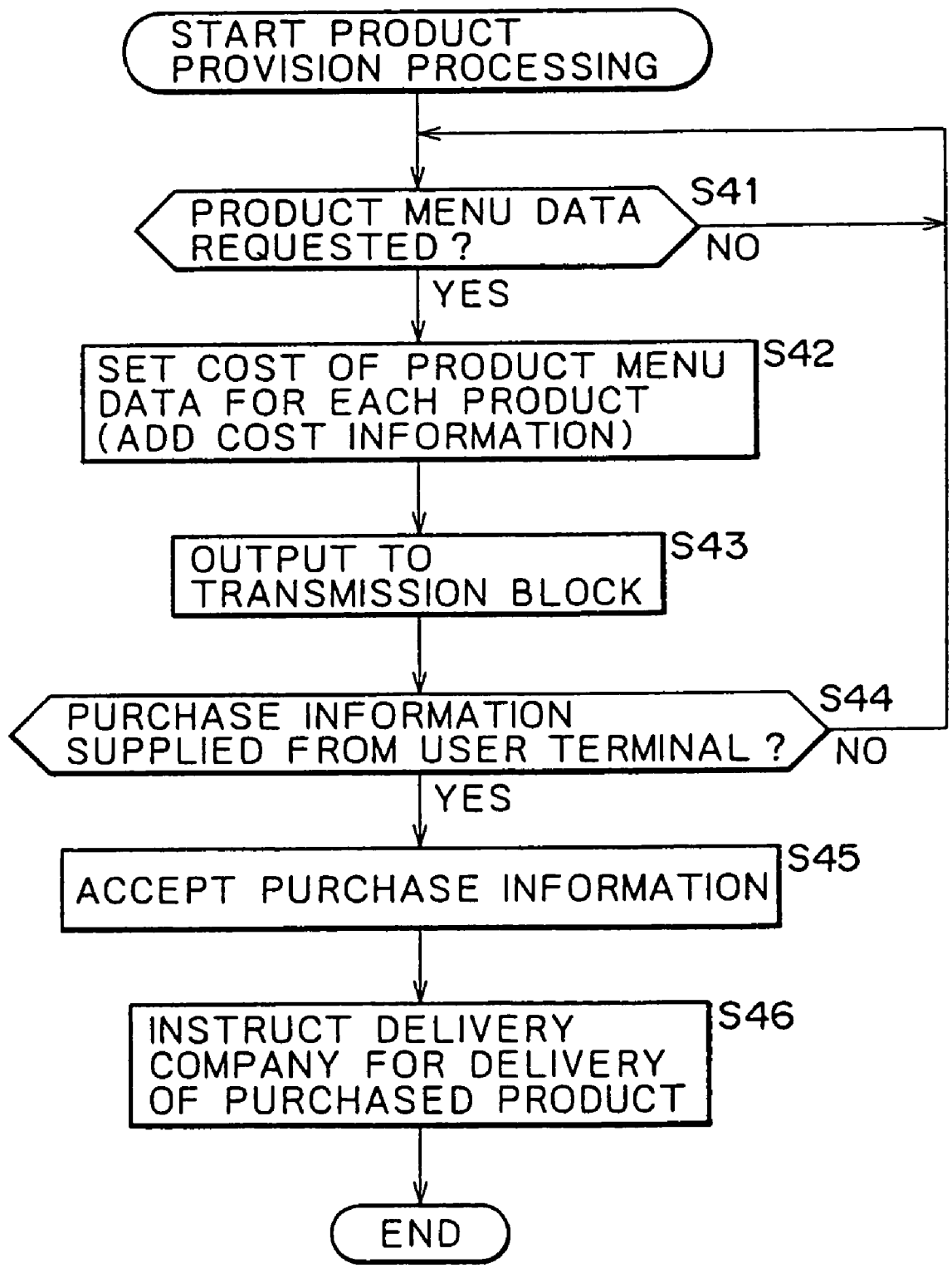
FIG. 12 is a flowchart describing product provision processing.

First, the product providing process by the product provider server 41 managed by the product provider 31 will be described with reference to the flowchart shown in FIG. 12.

In step S41, the product provider server 41 determines whether there is a request from the user terminal 6 operated by the user 3 for sending product menu data (namely, there is an access by the user terminal 6). The product provider server 41 repeats this operation until the request is found. If the request is found, the procedure goes to step S42.

In step S42, the product provider server 41 reads the requested product menu data from a predetermined database and adds to the retrieved product menu data the cost information of each product included in the product menu data in the content integration block 11.

In step S43, the content integration block 11 outputs the product menu data attached with the cost information to each product in step S42 to the transmission block 12.

In step S44, the user terminal 6 that has received the product menu data determines whether the purchase information for requesting the purchase of product has been transmitted. If the purchase information is found not transmitted, the procedure returns to step S41 and waits until another request for product menu data comes.

If, in step S44, the purchase information is found transmitted, then the procedure goes to step S45 to accept the product specified in the purchase information.

In step S46, the product provider server 41 transmits the information about the ordered product and the delivery information including the information about purchaser to a delivery management server 42 managed by the delivery company 32 contracted for product delivery in advance.

Figure 13:
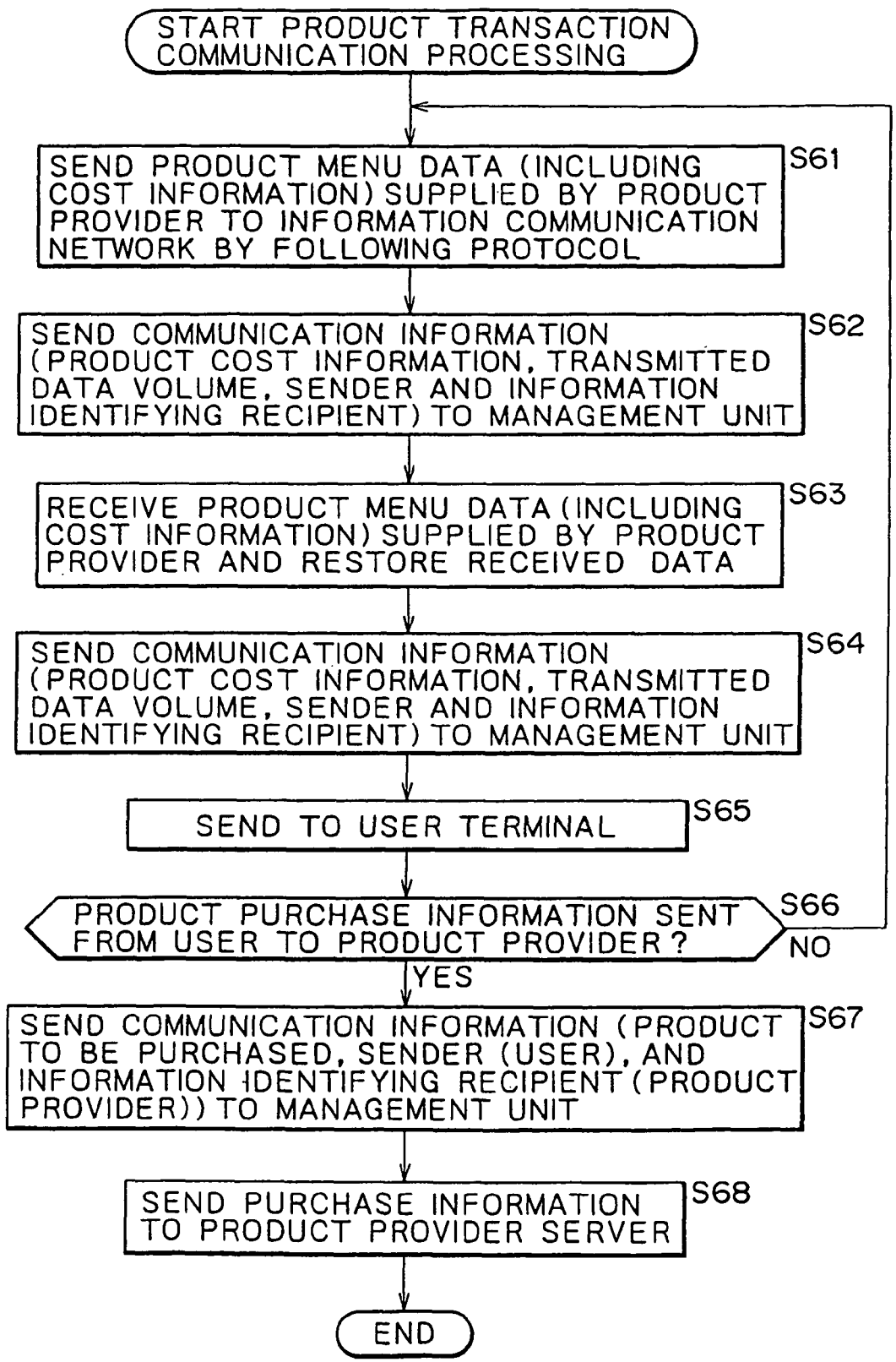
FIG. 13 is a flowchart describing product transaction communication processing.

The following describes a communication process for product transaction by the components, the transmission block 12 through the reception block 16, managed by the carrier 2 with reference to the flowchart shown in FIG. 13.

In step S61, the transmission block 12 converts the data format of the product menu data attached with the cost information for each product inputted from the product provider server 41 to the reception block 16 via the information communication network 14.

In step S62, the gating block 13 of the transmission block 12 acquires the information (attached cost information, transmitted data volume, information for identifying sender (the product provider 31), and information for identifying the recipient (the user 3)) associated with the transmitted product menu data and sends the acquired information to the management unit 19.

In step S63, the reception block 16 restores the original data format of the product menu data supplied via the information communication network 14.

In step S64, the gating block 15 of the reception block 16 acquires the information (attached cost information, received data volume, information for identifying sender (the product provider 31), and information for identifying the recipient (the user 3)) associated with the received product menu data and sends the acquired data to the management unit 19.

In step S65, the reception block 16 transmits the product menu data restored in step S63 to the user terminal 6.

In step S66, the reception block 16 determines whether the purchase information for requesting product purchase has been transmitted from the user terminal 6 to the product provider server 41 in response to the product menu data transmitted to the user terminal 6. If the purchase information is found not transmitted, the procedure returns to step S61 to execute the above-mentioned process when another piece of product menu data comes.

If, in step S66, the purchase information is found transmitted from the user terminal 6, then the procedure goes to step S67. In step S67, the gating block 15 of the reception block 16 extracts, from the received purchase information, the communication information (information for identifying product to be purchased, product delivery fee, communication fee (or the information necessary for computing communication fee), information for identifying sender (the user 3), and information for identifying recipient (the product provider 31)) and sends the extracted communication information to the management unit 19.

In step S68, the transmission block 12 sends the purchase information supplied from the user terminal 6 to the product provider server 41.

Figure 14:
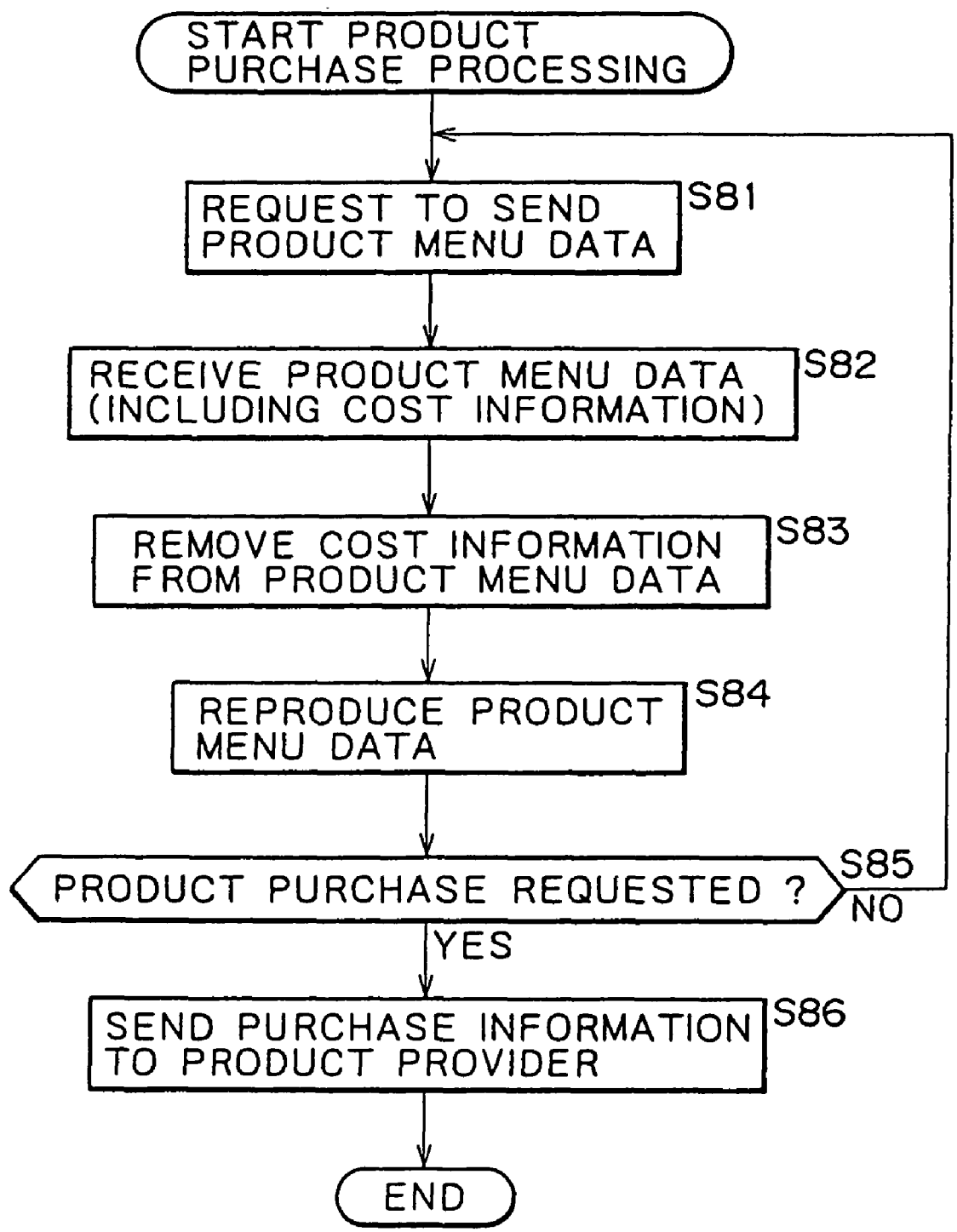
FIG. 14 is a flowchart describing product purchase processing.

The following describes a product purchasing process to be executed by the content separation block 17 and the content reproduction block 18 constituting the user terminal 6 with reference to the flowchart shown in FIG. 14.

In step S81, the user terminal 6 requests the product provider server 41 for product menu data. In response, the product provider server 41 transmits the requested product menu data as described above (step S43 of FIG. 12).

In step S82, the user terminal 6 receives at the content separation block 17 the product menu data supplied from the reception block 16.

In step S83, the content separation block 17 separates the cost information from each product included in the product menu data received in step S82 and outputs the resultant product menu data to the content reproduction block 18.

In step S84, the content reproduction block 18 reproduces the product menu data removed of the cost information for each product inputted from the content separation block 17.

In step S85, from the product menu reproduced in step S84, the user terminal 6 determines, instructed by the user 3, whether a product purchase is requested by the user 3. If a product purchase is found not requested, then the procedure returns to step S81 to execute the above-mentioned process again.

If, in step S85, a product purchase is found requested by the user 3, then the procedure goes to step S86. In step S86, the user terminal 6 sends the purchase information (information for identifying product to be purchased, communication fee (or information necessary for computing communication fee), information for identifying sender (the user 3), and information for identifying recipient (the product provider 31)) to the product provider server 41.

Figure 15:
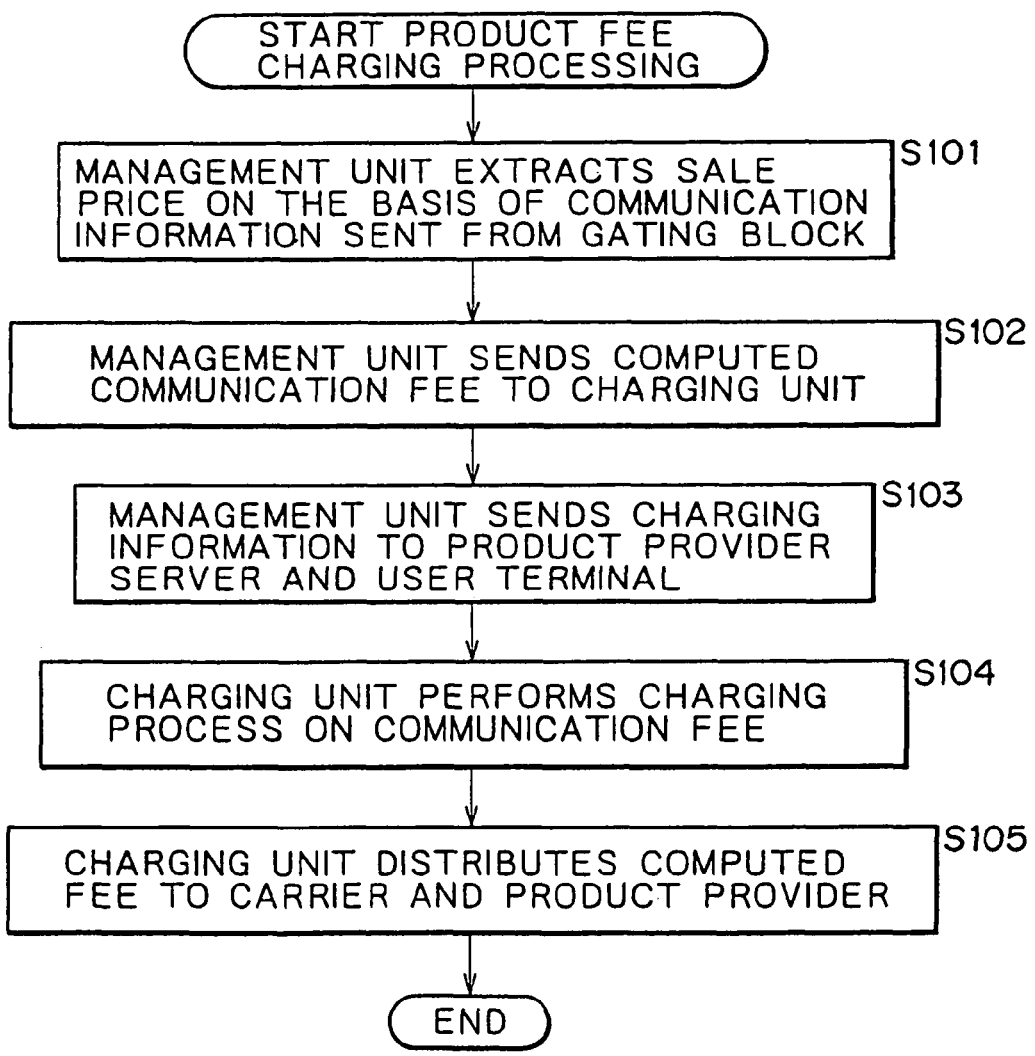
FIG. 15 is a flowchart describing product fee charging processing.

The following describes a product fee charging process to be executed by the fee collection server 7 managed by the fee collection service company 4 with reference to the flowchart shown in FIG. 15.

In step S101, the management unit 19 receives the communication information supplied from the gating block 13 of the transmission block 12 and the communication information supplied from the gating block 15 of the reception block 16. Then, the management unit 19 matches the received communication information with the communication information for identifying purchase product obtained at the gating blocks 13 and 15 obtained from the purchase information transmitted from the user terminal 6 to the product provider server 41. At the same time, the communication fee is computed as required. The sale price and the delivery fee are integrated with the communication fee.

In step S102, the management unit 19 sends the communication fee computed (or synthesized) in step S101 to the charging unit 20.

In step S103, the management unit 19 sends the product charging information to the user terminal 6 and the product provider server 33.

In step S104, the charging unit 20 charges the user 3 on the basis of the communication fee obtained in step S102.

In step S105, the charging unit 20 distributes the product fee collected from the user 3 in step S104 to the carrier 2 (the communication fee before it is integrated with the content fee), the product provider 31 (the sale price), and the delivery company 32 (the delivery fee).

In the above-described examples, each transaction in which the user 3 purchases a product is established when the user 3 transmits the purchase information about the product to be purchased via the information communication network 14 on the basis of the product menu data supplied from the product provider server 41. However, the product purchase form is not restricted to those described above.

For example, if agreements have been concluded between the user 3 and the product provider 31 to the effect that a product is delivered to the user 3 on a certain specified day every month, the fee collection service company 4 can execute a charging process on the basis of the information acquired from the gating blocks 13 and 15 by causing the product provider 31 to transmit the product information including the cost information about that product to the user 3. In this case, the user 3 need not transmit the purchase information to the product provider 31 via the information communication network 14 every time in response to the information supplied from the product provider 31. In this case, the delivery company 32 may only deliver the purchased product to the user 3 on a day specified by the product provider 31.

It should be noted that the present invention is applicable to any services that sell and/or buy digital content data through a given communication infrastructure.

The concentrated management of all services that sell and/or buy digital content data through a given communication infrastructure enhances the convenience for the user 3 because he may make payments only to the fee collection service company 4.

In addition, the user 3 need not execute the followings which are required with the prior-art. First, the user 3 is not required to enter certain certificates and personal information. Second, the user 3 need not download or install new software into the terminal device. Third, the user 3 need not pay in advance (for example, prepaid fee, purchase of electronic money, etc.). Fourth, the user 3 need not register with the carrier 2 beforehand. Fifth, the user 3 can acquire economic safety and security that the payment of fees is established by the establishment of communication.

On the other hand, because the present invention allows the information provider 1 (the product provider 31) and the carrier 2 to secure the collection of the content fee and the communication fee respectively, the present invention enhances the convenience of the sides of these enterprises. In addition, when the charging is made depending on data volume, the present invention allows the information provider 1 (the product provider 31) to set content costs as desired regardless of the data volume of digital content data for sale.

In the above-mentioned preferred embodiments of the invention, the cost information per unit data volume is attached to each unit data of content. It will be apparent to those skilled in the art that the cost information per unit data volume may be attached to a group of plural pieces of unit data. The price of digital content data is computed by multiplying a used or received data volume by the information cost per unit data volume.

In the above-mentioned preferred embodiments of the invention, the transmission information associated with digital content data is sent from the transmission block to the management unit and the reception information associated with the received digital content data is sent from the reception block to the management unit. The following alternatives can also be practiced.

Namely, a server for managing data transmission arranged on a communication route over which data are transmitted from a transmission block to a reception block may send the transmission information associated with this transmission to the management unit. Or a server for managing data transmission arranged halfway on a communication route over which data are transmitted from a transmission block to a reception block may send the reception information associated with this reception to the management unit. Or the server near the transmission block on the communication route may send the transmission information about transmission to the management unit and the server near the reception block arranged on the transmission route may send the reception information about reception to the management unit.

Consequently, the management unit is given the transmission information and the reception information from either the transmission block and the reception block, one of these information items from the server, or both from the server. Namely, the management unit is supplied with the transmission information and reception information about digital content data from a predetermined point on the communication route between the transmission block and the reception block inclusive.

The above-mentioned sequences of processes can be executed by hardware or software. The execution by software is supported by a computer in which the programs constituting the software are installed in a dedicated hardware device beforehand or by a general-purpose personal computer capable of executing various capabilities in which these programs are installed from the program storage medium.

FIG. 16 illustrates an exemplary configuration of a personal computer in which the software for executing the above-mentioned sequence of processes is installed. The personal computer incorporates a CPU (Central Processing Unit) 101. The CPU 101 is connected to an input/output interface 105 via a bus 104. The input/output interface is connected to an input block 106 composed of such input devices as keyboard and mouse, an output block 107 for outputting a processing result, for example, an audio signal, a display block 108 constituted by a display monitor for displaying an image of a processing result, a storage block 109 constituted by a hard disk drive for storing programs and various data, a communication block 110 constituted by a modem for communicating data via a LAN (Local Area Network) or the Internet, and a drive 111 which executes a data read/write operation on a magnetic disc (including floppy disc) 112, an optical disc (including CD-ROM (Compact Disc-Read Only Memory) 113 and DVD (Digital Versatile Disc) 114, a magneto-optical disc (including MD (Mini Disc), or a semiconductor memory 115. The bus 104 is connected to a ROM (Read Only Memory) 102 and a RAM (Random Access Memory) 103.

The software for executing the sequence of processes is supplied to the personal computer as stored in one of the magnetic disc 112 through the semiconductor memory 115. The supplied software is read by the drive 111 and installed in the hard disk drive incorporated in the storage block 109. The agent program stored in the storage block 109 is loaded from the storage block 109 into the RAM 102 for execution as instructed by the CPU 101 on the basis of a command inputted from the input block 106 by the user.

It should be noted that the steps describing the programs to be stored in the program storage medium are not only executed in a time-dependent manner in the order described, but also in parallel or in a discrete manner.

It should also be noted that the system as used herein denotes an entire apparatus constituted by a plurality of component units.

While the preferred embodiments of the present invention have been described using specific terms, such description is for illustrative purposes only, and it is to be understood that changes and variations may be made without departing from the spirit or scope of the appended claims.

What is claimed is:

1. A digital content data distribution system for delivering and selling digital content data over a network to a user, the system comprising:
   a first computing device to compute a content fee per unit volume of said digital content data;
   a second computing device to compute a communication fee charged for the delivery of said digital content data over the network;
   an integrating device to combine said content fee with said communication fee,
   wherein the integration of said content fee with said communication fee produces a total fee and the total fee is included in the digital content data;
   a charging device to charge the user a fee based on the content fee and the communication fee;
   a notifying device to notify a management device of receiving said fee information for identifying a sender, information for identifying a recipient, and a data volume of said received digital content data; and
   a transmitting device to transmit said digital content data to the user over the network.

2. The digital content data distribution system according to claim 1, further comprising:
   a dividing device to divide said digital content data into predetermined volumes of data.

3. The digital content data distribution system according to claim 1, further comprising:
   a notifying device to notify a management device of transmission information about said digital content data delivered by said delivery means.

4. A digital content data distribution method for delivering and selling digital content data over a network to a user, the method comprising:
   computing a content fee per unit volume of said digital content data; and
   computing a communication fee charged for the delivery of said digital content data over the network;
   integrating said content fee with said communication fee, wherein the integration of said content fee with said communication fee produces a total fee, wherein the total fee is included in the digital content data;
   charging the user a fee based on the content fee and the communication fee;
   notifying a management device of receiving said fee information for identifying a sender, information for identifying a recipient, and a data volume of said received digital content data; and
   delivering said digital content data to the use after verifying that the total fee was received from the user.

5. A non-transitory computer-readable storage medium having stored thereon a computer program that when executed on a processor causes the processor to perform a method for delivering and selling digital content data to a user over a network, said method comprising:
   computing a content fee per unit volume of said digital content data; and
   computing a communication fee charged for the delivery of said digital content data over the network;
   integrating said content fee with said communication fee, wherein the integration of said content fee with said communication fee produces a total fee, wherein the total fee is included in the digital content data;

charging the user a fee based on the content fee and the communication fee;

notifying a management device of receiving said fee information for identifying a sender, information for identifying a recipient, and a data volume of said received digital content data; and delivering said digital content data to the user after verifying that the total fee was received from the user.

6. A reception apparatus for receiving digital content data and a cost per unit volume information of said digital content data transmitted via a communication medium, the apparatus comprising:

a receiver to receive said digital content with a data format converted into a data format suitable for said communication medium and restoring the received digital content data;

a processor to remove said cost per unit volume information from the restored digital content data;

a charging device to charge the user a fee based on the cost per unit volume;

a notifying device to notify a management device of receiving said fee information for identifying a sender, information for identifying a recipient, and a data volume of said received digital content data; and a reproduction device to reproduce said digital content data without said cost per unit volume information.

7. The reception apparatus according to claim 6, further comprising:

a notifying device to notify a management device of receiving said fee information by said receiver.

8. A reception method for receiving digital content data and cost per unit volume information of said digital content data transmitted via a communication medium, the method comprising:

receiving via an interface operatively coupled to a processor said digital content with a data format converted into a data format suitable for said communication medium and restoring the received digital content data;

executing instructions received from a computer-readable storage medium to remove said cost per unit volume information from the restored digital content data;

charging the user a fee based on the cost per unit volume;

reproducing said digital content data without said cost information; and notifying a management device of receiving said fee information for identifying a sender, information for identifying a recipient, and a data volume of said received digital content data.

9. A non-transitory computer-readable storage medium having stored thereon a computer-readable program that when executed on a processor causes the processor to perform a method for receiving digital content data and a cost per unit volume information of said digital content data transmitted via a communication medium, said method comprising:

receiving said digital content data with a data format converted into a data format suitable for said communication medium and restoring the received digital content data;

removing said cost per unit volume information from the restored digital content data;

charging the user a fee based on the cost per unit volume;

reproducing said digital content data without said cost per unit volume information; and notifying a management device of receiving said fee information for identifying a sender, information for identifying a recipient, and a data volume of said received digital content data.

10. A digital content data distribution system for delivering and selling digital content data over a network to a user, the system comprising:

a first computing device to compute a content fee per unit volume of said digital content data;

a second computing device to compute a communication fee charged for the delivery of said digital content data over the network;

an integrating device to combine said content fee with said communication fee, wherein the integration of said content fee with said communication fee produces a total fee and the total fee is included in the digital content data;

a charging device to charge the user a fee based on the content fee and the communication fee;

a transmitting device to deliver said digital content data to the user over the network, wherein said digital content data is reproduced by the user by removing said total fee from said delivered digital content data; and a notification device to notify a management device of transmission information about said digital content data delivered by said transmitting device, wherein the transmission information includes at least one of said fee information, information for identifying a sender, information for identifying a recipient, and a data volume of said received digital content data.

11. A reception apparatus for receiving digital content data and a cost per unit volume information of said digital content data transmitted via a communication medium, the apparatus comprising:

a receiver to receive via an interface operatively coupled to a processor said digital content data with a data format of the digital content data converted into a data format suitable for said communication medium and restoring the received digital content data;

a processor to remove said cost per unit volume information from the restored digital content data;

a charging device to charge the user a fee based on the cost per unit volume;

a reproducing device to reproduce said digital content data without said cost per unit volume information; and a notifying device to notify a management device of receiving said fee information by said receiver, wherein notifying the management-device of receiving said fee information includes at least one of said fee information, information for identifying a sender, information for identifying a recipient, and a data volume of said received digital content data.

* * * * *